L. SCHNEIDER.
EGG BEATER.
APPLICATION FILED JUNE 11, 1912.
1,054,797.
Patented Mar. 4, 1913.
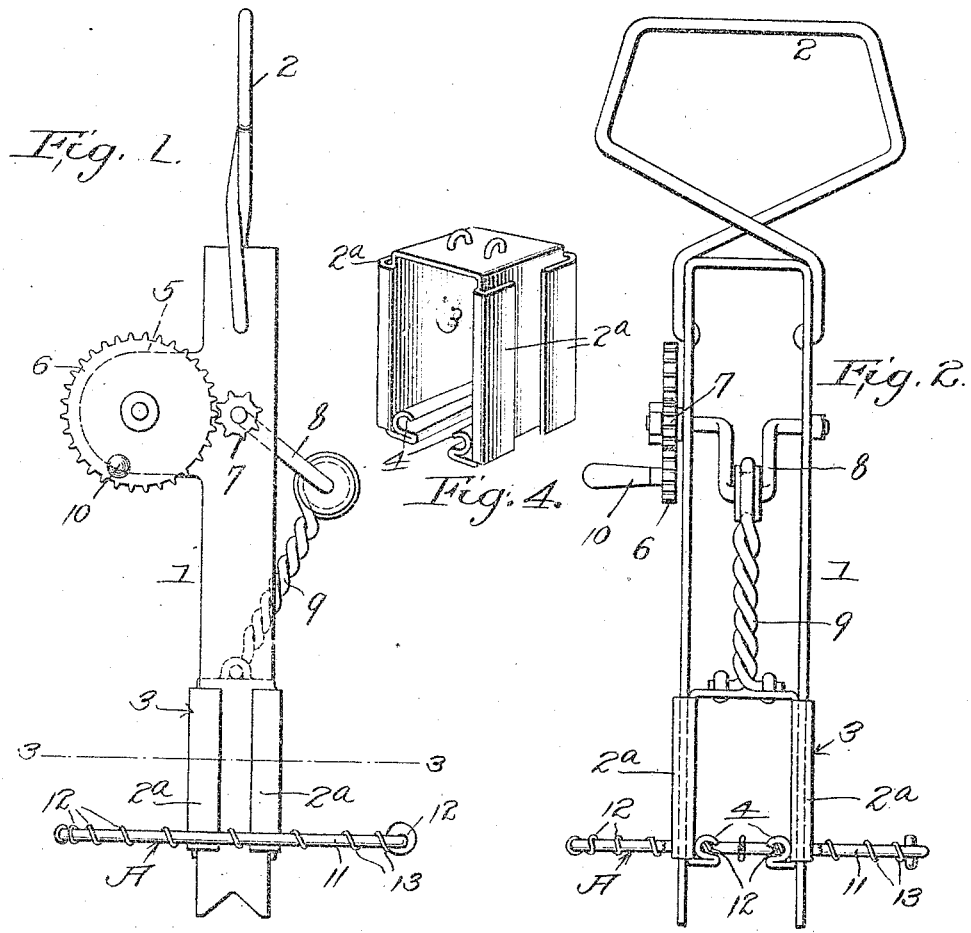
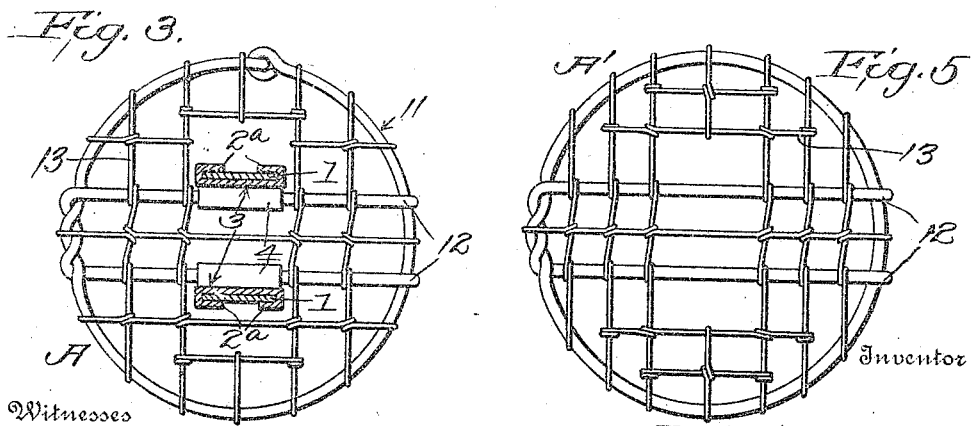

UNITED STATES PATENT OFFICE.

LORENZ SCHNEIDER, OF JONESBORO, ARKANSAS.

EGG-BEATER.

1,054,797.

Specification of Letters Patent. Patented Mar. 4, 1913.

Application filed June 11, 1912. Serial No. 703,018.

*To all whom it may concern:*

Be it known that I, LORENZ SCHNEIDER, a subject of the Emperor of Germany, residing at Jonesboro, in the county of Craighead and State of Arkansas, have invented certain new and useful Improvements in Egg-Beaters, of which the following is a specification.

The present invention relates in general to culinary implements, and more particularly to an improved beater or mixing device which is adapted to be employed either as an egg beater, a cake mixer, a cream whipper, or for other similar purposes.

The object of the invention is to provide a device of this character which is comparatively simple and inexpensive in its construction, which is easy of manipulation, and which embodies novel features of construction whereby it will operate in a quick and effective manner to accomplish the desired result.

With this and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of an egg beater constructed in accordance with the invention. Fig. 2 is a front view of the same. Fig. 3 is a horizontal sectional view on the line 3—3 of Fig. 1. Fig. 4 is a perspective view showing the slide detached, and Fig. 5 is a plan view showing a modified form of beater.

Corresponding and like parts are referred to in the following description and indicated in all the views of the drawings by the same reference characters.

Specifically describing the present embodiment of the invention, the numeral 1 designates the stock or frame of the device. This frame is shown as having an inverted U shaped formation, the curved upper end of the frame being provided with a suitable handle 2 which can be conveniently grasped when manipulating the device. A slide 3 is mounted between the parallel arms of the frame 1 so as to be vertically reciprocated. This slide may be conveniently formed of sheet metal and also has an inverted U shaped formation. The two arms of the slide are formed with the lateral wings 2ª which are bent around the respective sides of the frame 1 so as to loosely engage the same. The lower end of each of the arms of the slide 3 is bent to provide an inwardly facing spring clip 4, the said spring clips on opposite sides of the slide having an opposed relation to each other. One of the sides of the frame 1 is provided toward the upper end thereof with a laterally projecting ear 5 which has a gear wheel 6 journaled thereon, the said gear wheel meshing with a pinion 7 upon a crank shaft 8 which is journaled upon the frame 1 and extends between the two sides thereof. The crank portion of the crank shaft 8 is connected by a pitman 9 to the upper end of the slide 3. A suitable handle 10 is provided upon the gear wheel 6 and by rotating this gear wheel the crank shaft 8 can be revolved so as to produce a quick up and down movement of the slide 3.

The beater A is detachably connected to the slide 3 so that different beaters can be applied to the device according to the nature of the work which it is desired to perform. This beater A comprises an outer frame or ring 11 which is provided with two spaced cross bars 12, and has perforate or mesh material 13 stretched over the same. Suitable reinforcing ribs 15 may be provided for this mesh material 13, if found necessary, and suitable openings are provided in the same to receive the arms of the frame 1. When applying the frame to the device, the two arms of the frame 1 are inserted through the openings in the mesh of the beater on the outside of the two cross bars 12. The spring clips 4 of the slide 3 are then caused to engage the cross bars 12 so as to connect the beater to the slide. This action is facilitated by reason of the fact that the frame 1 and slide 3 are formed of spring material which admit of the clips being sprung apart a limited amount. The cross bars 12 may also be formed of spring material so as to further facilitate this operation. This beater A will be readily reciprocated up and down when the handle 10 is turned, and this movement of the beater will serve in an effective manner to beat or mix the material being operated upon.

It is contemplated to provide two or more of the beaters for each of the operating mechanisms, and Fig. 6 serves to illustrate a beater A' which is identical in construction with the beater A, with the exception that the perforate or mesh material 13 is of a different character. These two beaters A and A' are interchangeable, and either may be employed according to the character of the material which it is desired to operate upon.

Having thus described the invention, what I claim as new and desire to secure by Letters Patent, is:—

1. A device of the character described including a frame, a slide mounted upon the frame, means for reciprocating the slide, a spring clip carried by the slide, and a beater constructed to be detachably engaged by the spring clip of the slide.

2. A device of the character described including a frame, a slide mounted upon the frame, means for reciprocating the slide, a pair of spring clips carried by the slide, and a beater formed with spaced bars adapted to be detachably engaged by the said clips.

3. A device of the character described including a frame formed with spaced sides, a slide mounted upon the frame, means for reciprocating the slide, a pair of spring clips carried by the slide, and a beater including a frame provided with cross bars and carrying a perforate sheet, the said perforate sheet being suitably cut away to receive the side pieces of the frame and the spring clips of the slide being adapted to detachably engage the cross bars of the beater.

4. A device of the character described including a main frame formed with spaced sides, a slide mounted upon the main frame and formed from a single sheet of material, said slide having an arched formation and the sides thereof being formed with wings which extend around and loosely engage the sides of the frame and the ends of the arched guide being bent to provide spring clips, means for reciprocating the slide, and a beater formed with spaced bars adapted to be detachably engaged by the spring clips of the slide.

In testimony whereof I affix my signature in presence of two witnesses.

LORENZ SCHNEIDER.

Witnesses:
T. C. MARTIN,
THOS. A. TYNIN.